US009787528B2

(12) United States Patent
Arwe et al.

(10) Patent No.: US 9,787,528 B2
(45) Date of Patent: *Oct. 10, 2017

(54) INSTANTIATING RESOURCES OF AN IT-SERVICE

(71) Applicant: International Business Machines Corporation, Armonk, NY (US)

(72) Inventors: John E. Arwe, Poughkeepsie, NY (US); Gerd Breiter, Wildberg (DE); Marek Chodorowski, Debno Polskie (PL); Felix Dross, Bochum (DE); Narine Kokhlikyan, Karlsruhe (DE); Hoang Anh Le, Karlsruhe (DE); David B. Lindquist, Raleigh, NC (US); Simon Moser, Stuttgart (DE); Isabell Schwertle, Metzingen (DE); Thomas Spatzier, Sindelfingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,556

(22) Filed: Aug. 2, 2016

(65) Prior Publication Data

US 2016/0344840 A1 Nov. 24, 2016

Related U.S. Application Data

(63) Continuation of application No. 14/099,966, filed on Dec. 8, 2013, now Pat. No. 9,432,247, which is a (Continued)

(30) Foreign Application Priority Data

Jun. 27, 2012 (GB) .................................. 1211388.2

(51) Int. Cl.
G06F 9/50 (2006.01)
H04L 12/24 (2006.01)
(Continued)

(52) U.S. Cl.
CPC .............. *H04L 41/022* (2013.01); *G06F 9/50* (2013.01); *G06F 9/5005* (2013.01);
(Continued)

(58) Field of Classification Search
CPC ...... G06F 9/5033; G06F 9/548; G06F 9/5077; G06F 9/455; G06F 9/5022; G06F 9/4553;
(Continued)

(56) References Cited

U.S. PATENT DOCUMENTS 7,197,553 B2   3/2007   Roberts et al.
7,516,457 B2   4/2009   Eilam et al.
(Continued)

FOREIGN PATENT DOCUMENTS

CN   101776996   7/2010
EP   1887466   2/2008
(Continued)

OTHER PUBLICATIONS

Wuhib, Fetahi Zebenigus; Distributed Monitoring and Resource Management for Large Cloud Environments; Doctoral Thesis; KTH, School of Electrical Engineering; Stockholm, Sweden; Dec. 2010.
(Continued)

*Primary Examiner* — Le H Luu
(74) *Attorney, Agent, or Firm* — James L. Baudino

(57) ABSTRACT

Instantiating a resource of an IT-service includes analyzing a service model of the IT-service where the service model includes a node representing a resource for providing the IT-service. A resource type of the resource being indicated by the node is determined, and a service provider catalog is
(Continued)

evaluated to determine a resource manager operable to instantiate the resource and an address of the resource manager. A request is sent to the address of the resource manager for a description of a resource-manager-specific API of the resource manager. Upon receipt of the requested description, at least one abstract method for instantiating the resource is overridden with a resource-manager specific method of the resource-manager-specific API, and the resource-manager specific method for instantiating the resource represented by the node is executed.

15 Claims, 5 Drawing Sheets

Related U.S. Application Data continuation of application No. 13/907,297, filed on May 31, 2013, now Pat. No. 9,203,774.

(51) Int. Cl.
    *H04L 29/08*     (2006.01)
    *H04L 12/911*     (2013.01)
    *H04L 12/70*     (2013.01)

(52) U.S. Cl.
    CPC .......... *G06F 9/5016* (2013.01); *G06F 9/5027* (2013.01); *H04L 29/08153* (2013.01); *H04L 29/08468* (2013.01); *H04L 41/046* (2013.01); *H04L 41/0806* (2013.01); *H04L 41/12* (2013.01); *H04L 41/22* (2013.01); *H04L 41/5041* (2013.01); *H04L 41/5048* (2013.01); *H04L 41/5051* (2013.01); *H04L 47/70* (2013.01); *H04L 67/10* (2013.01); *H04L 67/32* (2013.01); *H04L 2012/5631* (2013.01)

(58) Field of Classification Search
    CPC .......... G06F 9/443; G06F 9/50; G06F 9/5027; G06F 9/5016; G06F 9/5005; G06F 8/20; G06F 21/621; H04L 12/24; H04L 47/70; H04L 41/5041; H04L 41/0806; H04L 2012/5631; H04L 29/08153
    See application file for complete search history.

(56) References Cited

U.S. PATENT DOCUMENTS

| | | | |
|---|---|---|---|
| 7,890,543 B2* | 2/2011 | Hunt | G06F 9/4433 707/803 |
| 2003/0070006 A1 | 4/2003 | Nadler et al. | |
| 2003/0177182 A1* | 9/2003 | Clark | G06F 9/5033 709/203 |
| 2004/0019898 A1* | 1/2004 | Frey | G06F 9/548 719/330 |
| 2004/0225952 A1* | 11/2004 | Brown | G06F 8/20 714/819 |
| 2005/0071350 A1 | 3/2005 | Artale et al. | |
| 2007/0006325 A1* | 1/2007 | Gargaro | G06F 21/6218 726/27 |
| 2008/0189713 A1* | 8/2008 | Betzler | H04L 12/24 718/104 |
| 2010/0299677 A1 | 11/2010 | Wolff | |
| 2010/0332622 A1 | 12/2010 | Carolan et al. | |
| 2011/0022812 A1* | 1/2011 | van der Linden | G06F 9/5077 711/163 |
| 2011/0029882 A1 | 2/2011 | Jaisinghani | |
| 2011/0106950 A1 | 5/2011 | Schlack | |
| 2011/0138047 A1 | 6/2011 | Brown et al. | |
| 2011/0145392 A1 | 6/2011 | Dawson et al. | |
| 2011/0145404 A1 | 6/2011 | Gingell, Jr. et al. | |
| 2011/0191781 A1 | 8/2011 | Karanam et al. | |
| 2012/0185913 A1* | 7/2012 | Martinez | G06F 9/455 726/1 |
| 2012/0233668 A1* | 9/2012 | Leafe | G06F 9/5022 726/4 |
| 2013/0247034 A1* | 9/2013 | Messerli | G06F 9/45533 718/1 |

FOREIGN PATENT DOCUMENTS

| | | |
|---|---|---|
| EP | 1978677 | 10/2008 |
| GB | 2339621 | 2/2000 |

OTHER PUBLICATIONS

Younge, Andrew J., et al.; Efficient Resource Management for Cloud Computing Environments; 2010 International Green Computing Conference; Aug. 2010.

Xingye, Han, et al.; Research on Resource Management for Cloud Computing Based Information System; 2010 International Conference on Computational and Information Sciences; Dec. 2010.

Search Report; United Kingdom Patent Application No. 1211388.2; Oct. 23, 2012.

Search Report; China Application No. 2013102476060.0; Dec. 15, 2015.

Office Action; China Application No. 201310247606.0; Dec. 29, 2015.

* cited by examiner

US 9,787,528 B2

INSTANTIATING RESOURCES OF AN IT-SERVICE

BACKGROUND

Distributed computing systems are increasingly being utilized to support business applications and technical applications of various fields. Distributed computing systems comprise a plurality of hardware- and/or software-based resources together providing IT-services to various clients, e.g. in the field of B2B or B2C services. Distributed computing systems are employed, for example, in the realm of cloud computing wherein application programs, virtual machines, storage capacity and/or processing capacity are provided to a plurality of clients as a service. In some use case scenarios distributed computing systems provide services to a plurality of clients via a network, e.g. the Internet, whereby the services are based on a plurality of redundant software- and/or hardware resources for ensuring an efficient and reliable service provisioning.

However, the deployment and administration of such a system is an organizational challenge as the resources may be of a plurality of different resource types (e.g., application servers, storage media, networked devices, applications, processing units) and may be provided by different manufacturers or software developers (and may thus be addressable only via a manufacturer-specific/proprietary API).

As a consequence, the operator of a distributed computing system intending to allocate or re-allocate resource instances to a particular IT-service must provide the module responsible for instantiating and/or allocating a resource to an IT-service with all the details of the proprietary APIs to enable said module to communicate with the respectively used resource manager. Thus, protocols and interfaces of a plurality of different resource managers must be "known" by said module when modeling or building a new IT-service. In other words, the module for instantiating and allocating resources and the respectively employed resource managers are tightly coupled to each other, and adding resource managers of a new resource type or employing a different proprietary API dynamically to an IT-service in operation is not possible.

BRIEF SUMMARY

According to one aspect of the present disclosure a method, system, computer program product and technique for instantiating resources of an IT-service is disclosed. In a further aspect, a method, system, computer program product and technique for allocating instantiated resources (also referred herein as 'resource instances') to an IT-service is disclosed. The method includes analyzing a service model having nodes representing resources and being indicative of a resource type where each node comprises a generic API providing at least one abstract method for instantiating the resource represented by the respective node. For each node, the resource type indicated by the node is determined. A service provider catalog indicative of a resource manager operable to provide a resource of a given resource type is evaluated, and an address of the resource manager is determined. A resource manager is selected, and a request is sent to the address of the selected resource manager for a description of a resource-manager-specific API of the resource manager. The requested description from the selected resource manager is received, and the abstract method for instantiating the resource is overridden by a resource-manager specific method of the resource-manager-specific API. The resource-manager specific method is then executed to instantiate the resource represented by the node.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
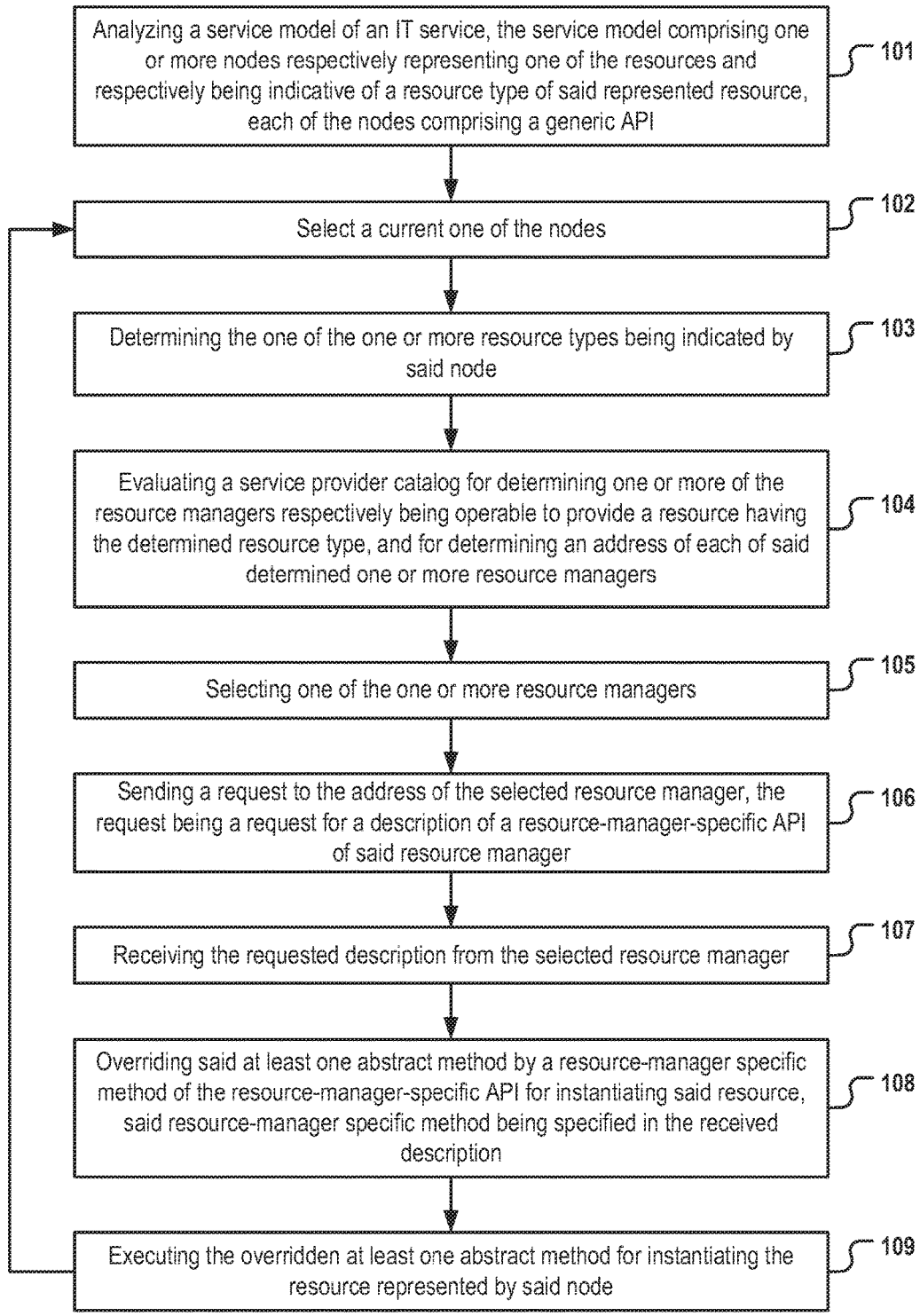
FIG. 1 is a flowchart of a method for instantiating a resource.

Embodiments of the present disclosure provide a method, system and computer program product for instantiating one or more resources of an IT-service, each resource being of one of one or more resource types, and each resource being provided by one of one or more resource managers of an IT-service management system. For example, in some embodiments, the method and technique includes: analyzing, by a management engine, a service model of the IT-service, the service model comprising nodes respectively representing one of the resources and respectively being indicative of a resource type of the represented resource, each of the nodes comprising a generic API, the generic API not being specific to any particular one of the resource managers and providing at least one abstract method for instantiating the resource represented by the respective node; and for each of the nodes, executing, by the management engine, at runtime of the IT-service management system: determining the one of the one or more resource types being indicated by the node; evaluating a service provider catalog, the service provider catalog being indicative of one or more of the resource managers respectively being operable to provide a resource of a given resource type, for determining one or more of the resource managers respectively being operable to provide a resource having the determined resource type, and for determining an address of each of the determined one or more resource managers; selecting one of the one or more resource managers; sending a request to the address of the selected resource manager, the request being a request for a description of a resource-manager-specific API of the resource manager; receiving the requested description from the selected resource manager; overriding the at least one abstract method by a resource-manager specific method of the resource-manager-specific API for instantiating the resource, the resource-manager specific method being specified in the received description; and executing the overridden at least one abstract method for instantiating the resource represented by the node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A cloud computing environment is service oriented with a focus on statelessness, low coupling, modularity, and semantic interoperability. At the heart of cloud computing is an infrastructure comprising a network of interconnected cloud computing nodes. It is understood in advance that although this disclosure may be used in a cloud computing environment, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics and at least three service models and at least four deployment models. Characteristics are as follows: On-demand self-service, broad network access, resource pooling, rapid elasticity, and measured service. Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A 'resource' as used herein is something that provides a functionality which can be provided, alone or in combination with the functionalities of other resources, to one or more client processing devices in the form of a service. A resource may be a hardware component, e.g. a network card, a router, a processing unit, a non-transitory storage medium, a transitory storage medium (e.g. a RAM), or the like. A resource can be a software component, a collection of audio or video files, an application program, a web server, an application server, or the like. A resource can also be based on a mixture of hardware and software components, e.g. a network device comprising a software- or firmware-based routing functionality. A resource may also be a virtual machine.

A 'resource type' as used herein specifies a category a particular resource belongs to, wherein said category preferentially does not rely to any particular manufacturer, vendor or distributor of a resource. For example, the resource type 'storage medium' may cover SATA disks, SAS disks and other storage types, the resource type 'application server' may cover application servers such as WebSphere, JBoss, GlassFish or the like. For example and without limitation, a resource type can be one of 'application program', 'application server', 'disc image', 'virtual machine', 'processing unit', 'storage medium', 'memory', and the like.

A 'resource manager' as used herein is a program module adapted for providing a resource of a particular resource type. Typically, the resource manager is provided by the vendor, distributor or developer of a resource in combination with the respectively managed resource. According to some embodiments, the resource manager is an integral part of the resource managed by the resource manager. The expression 'a resource manager providing a resource' as used herein shall be understood as a resource manager being operable to instantiate said resource, and to manage said resource by controlling the functions executed by said resource instance and/or by deleting said resource instance if required. In case multiple instances can be created from a particular resource (as may be the case, for example, for application programs or application servers acting as resource), the management of said multiple instance shall also be considered as being subsumed by the expression 'managing a resource'.

An 'IT-service' or 'service' as used herein is a set of one or more functions provided by a set of one or more resources. The IT-service may be provided via a network, e.g. the Internet, to one or more client computers. A service can also be based on a mixture of multiple resources of different types, e.g. a storage medium (1st resource) hosting an application server (2nd resource), the application server providing an application program (3rd resource) as a service to one or more remote client devices. According to embodiments, the IT-Service is provided by means of a cloud computing environment.

An 'IT-service management system' as used herein relates to a data processing system being operable to provide one or more instances of one or more IT-services to one or more service consumers, e.g. client computers of business partners, end users, licensees or the like. The IT-service management system may provide some interfaces for requesting a particular IT-service, and may provide some means for adding and removing resource managers and respective resources to the IT-service management system, the resources being used for constituting and providing the IT-service(s).

A 'management engine' as used herein is a piece of program logic (e.g., a piece of firmware, hardware, a program module or application program) of an IT-service management system which is adapted for providing, managing and/or for allocating resources provided by one or more resource managers of an IT-service management system to one or more IT-services.

A 'service model' or 'service template' as used herein is a specification of one or more resources and their interrelation with each other, said resources collectively providing an IT-service whose structure is specified in said service model. In other words, a service model specifies the structure and composition of an IT-service. Each resource specification in the service model may be annotated with a respective resource type, resource type specific methods and parameters, and with one or more relations of said resource in respect to one or more other resources. In the service model, the resources may be represented as nodes of a graph and the relationships between the resources may be represented as edges. According to embodiments, each node comprises a generic API, the generic API comprising abstract methods and parameters depending solely on the resource type and not on any particular resource manager providing resources of said resource type. Thus, the service model comprises a generic specification of the number, type and interrelation of resources whose instances collectively constitute an IT-service. Said generic specification is based on the generic API of the nodes. According to embodiments, the service model is a file, e.g. an XML, file.

A 'node' or 'node template' as used herein is a section of the service model representing a resource and comprising data to be evaluated by a management engine when instantiating said resource. A service model may further comprise 'group templates' (i.e., a section of the service model indicating one or more of the nodes of the service model to belong to a node group). The node group may be annotated with or have otherwise assigned one or more group rules.

A 'generic API' as used herein comprises abstract methods and parameters depending solely on the resource type and not on any particular resource manager providing resources of said resource type. Each node in the service model representing a resource may be annotated with methods and parameters in accordance with the generic API. According to embodiments, the generic data format is specified in accordance with the TOSCA standard as specified in http://www.oasis-open.org/committees/tosca/.

A 'parameter' of a generic API as used herein may refer to an input or output parameter of the abstract method of the generic API and/or may refer to a 'property' or 'attribute' of a node representing a resource.

A 'service provider catalog' as used herein is a database, e.g. a relational database, file, file directory or the like, having stored a list of resource managers currently belonging to the IT-service management system and being operable to instantiate and/or manage a resource of a particular resource type. The resource instance catalog may comprise an address for each of the listed resource managers allowing to send a request for a description of said resource manager's resource-manager specific API to said address.

A 'resource instance catalog' as used herein is a database, e.g. a relational database, file, file directory or the like, having stored a list of resource instances currently existing in the IT-service management system. The resource instance catalog may in addition comprise, for each of said instances, an indication of a resource type of said instance and of one or more parameter values of said instance and/or of parameter values of a runtime environment currently hosting said resource instance.

A 'resource-manager-specific API' as used herein comprises concrete methods and parameters provided by a particular resource manager and allowing other programs, e.g. a management engine, to interact with said resource manager for instantiating and/or managing a resource provided by said resource manager. According to embodiments, the resource-manager-specific API can be accessed via one or more transmission protocols.

'Overriding a method' as used herein relates to the process of replacing an instance of an abstract method of the generic API of a resource by an instance of a corresponding concrete method of the resource manager specific API of the resource manager providing said resource. A 'corresponding' concrete method is a method whose name and input parameters are mapped to a respective name and parameters of the abstract method. According to embodiments, said mapping is executed by the management engine dynamically upon evaluating a description of the resource-manager specific API. An overridden method can also return or receive a subtype of the parameter type returned or received by the overridden method.

An 'abstract method' as used herein is a method that is declared without an implementation or with an implementation not being sufficient for executing said method's function.

A 'process model' as used herein is any specification of the chronological sequence of steps to be executed in order to instantiate an IT-service in accordance with said IT-service's service model. Said steps may comprise the instantiation of a resource of a particular type, the calling of an abstract method of a particular resource instance, the evaluation of a conditional expression for selecting one of a plurality of possible processing branches, or the like. According to embodiments, the service model comprises a process model in addition to the graph of nodes representing the resources. According to other embodiments, the chronological sequence of steps to be executed for instantiating the service is inherently specified in the topology of said graph.

A 'relationship type' as used herein is a type of relation connecting two nodes of a service model (and thus connecting also two resources represented by the connected nodes). A relationship type can be directed or undirected. According to embodiments, each edge connecting two nodes may have assigned one or more relation types, wherein one relationship type is directed and indicates the chronological order of instantiating the resources constituting the IT-service of the service model.

The interoperation of the management engine and a resource manager for instantiating a resource and/or for managing or deleting the instantiated resource as used herein implies that the generic API of a node representing a particular resource enables the management engine to call said generic API's abstract functions for initiating the resource and/or for controlling or deleting the initiated resource. The fact that the respective abstract method was called by the management engine is communicated to the resource manager and triggers the execution of steps enabling the management engine in interoperation with the resource manager to execute the corresponding concrete method, thereby overriding the called abstract method. According to embodiments, the execution of the concrete method is triggered by the management engine calling the corresponding concrete method via the resource-manager specific API.

A 'transmission protocol' as used herein is any kind of communication standard and/or communication protocol allowing the management engine to exchange data with the resource manager for interoperating with the resource manager for executing the corresponding concrete method of the resource manager specific API.

A 'rule' as used herein encompasses any computer-interpretable expression comprising two parts: the first part comprises one or more conditions to be evaluated on one or more parameter values. The second part of the rule comprises instructions specifying one or more functions to be executed in dependence on the result of said evaluation.

A 'load characteristic' as used herein is a parameter value being obtained by monitoring an existing resource instance or an IT-service comprising said resource instance. A load characteristic may be, for example, the number of requests submitted to an IT-service or to a resource instance in a given time period. Said number may be given as percentage value or as a total amount of processing units, memory or storage space occupied by a resource, network traffic of I/O requests to said resource, or the like.

A 'concerted management of multiple instances of a resource' as used herein encompasses any resource management workflow according to which the instantiation of a resource and/or the control or deletion of an instance of said resource depends on the existence of other instances of said resource and/or on some property values (load characteristics, runtime properties being indicative of e.g. the type and location of the runtime environment hosting the resource instance) of said other instances or runtime environment hosting said other instances.

A 'runtime environment' as used herein can be hardware- or software based. A runtime environment may be, for example, a virtual machine, an application server or a server computer. The runtime environment may be represented as a node in the service model, said node being connected to another node representing a resource hosted in said runtime environment. Said two nodes may be connected to each other in the service model by an edge belonging to a 'hosted-on' relationship type.

Figure 2:
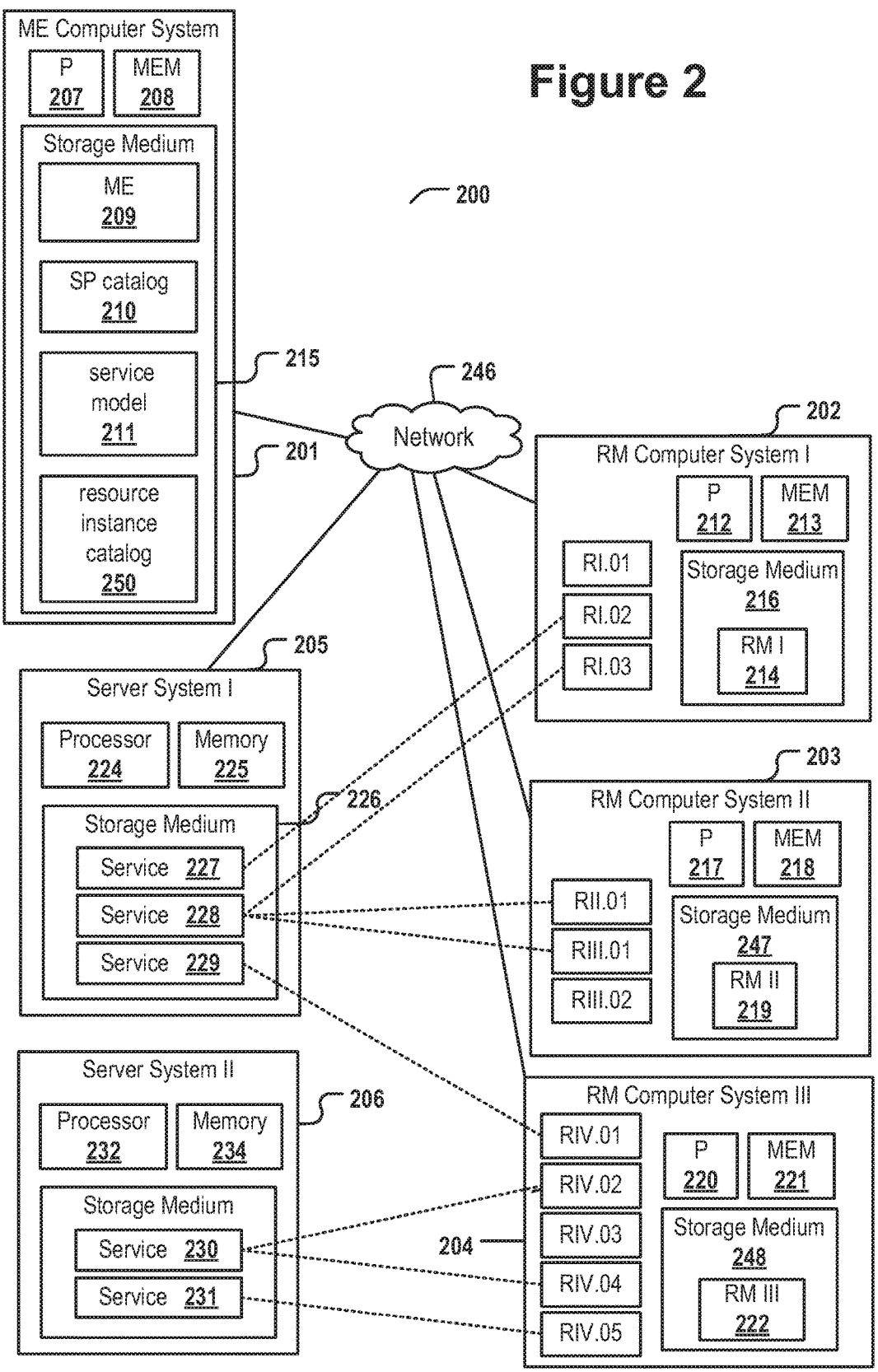
FIG. 2 depicts an IT-service management system comprising multiple resource managers and multiple resources.

FIG. 1 depicts a computer implemented method according to an embodiment of the invention. Said method may be executed e.g. by a management engine (ME) 209 of a distributed computer system as depicted in FIG. 2. In the following description of FIG. 1, reference will also be made to elements of the computer system depicted in FIG. 2. In step 101, a service model 211 is analyzed and one of the nodes in the service model is selected as current node in step 102. Each of the nodes represents a resource R01-R11 of an IT-service management system 200. For the selected current node, the steps 103-109 are executed. In step 103, a resource type of the resource represented by the current node is determined. In step 104, a service provider catalog 210 is evaluated in order to determine one or more of the resource managers respectively being operable to instantiate a resource of the determined resource type. In addition, an address of each of the determined resource managers is determined by evaluating the service provider catalog. One of the one or more resource managers having been determined in step 104 is selected in step 105. In step 106, a request is sent to the address of the selected resource manager in order to receive the description of a resource-manager-specific API of the selected resource manager. The ME receives, in response to the request, the requested description in step 107 from the selected resource manager. In step 108, at least one abstract 'create' method for instantiating a resource of the determined resource type is overwritten by a corresponding concrete 'create' method of the resource-manager-specific API of the selected resource manager. The concrete implementation of the abstract method is specified in the description having been received in step 107 by the ME. By executing the overridden at least one abstract method by the ME in interoperation with the selected resource manager, the resource represented by the current node is instantiated in step 109. Steps 102-109 are repeated until all nodes in the service module have been selected as current nodes and the corresponding resources have been instantiated.

FIG. 2 depicts an IT-service management system 200 comprising multiple computer systems 201-206 connected to each other via a network 246. The network may be, for example, the Internet or an intranet. A management engine computer system 201 comprises a processor 207, memory 208 and a storage medium 215. The storage medium comprises computer-readable instructions which, when executed by the processor 207, cause the provision of a management engine 209 (ME). In addition, storage medium comprises a service provider catalog 210, a service model 211 and may according to some embodiments, also comprise a resource instance catalog 250. A plurality of alternative implementation variants exist according to which the service provider catalog, the service model and/or the resource instance catalog may be stored to additional storage media being operatively coupled to the ME 209. One or more server computer systems 205, 206 respectively comprising one or more processors 224, 232 and a memory 225, 234 may provide one or more IT-services 227-231 to one or more client computer systems (not shown), whereby the services are respectively based on one or more resource instances whose instantiation and/or allocation to the respective IT-services is controlled by the ME 209 interoperating with one or more resource managers 214, 219, 222. According to alternative implementation variants, the services may be hosted on storage medium 215 of the computer system hosting the ME 209. Computer system 202 comprising a processor 212, memory 213 and storage medium 216 runs a resource manager 214 being operable to instantiate and manage a resource RI of a first resource type. Currently, three instances RI.01-RI.03 of said resource have been created by the ME 209 in interoperation with the resource manager 214. Computer system 203 also comprising a processor 217, memory 218 and a storage medium 247 is operable to instantiate and manage a resource RII of a second resource type and a further resource RIII of a third resource type. The second resource type may be of a single instance resource type while the third resource type may be a multiple-instance-resource type. According to the depicted system state, two instances RIII.01, RIII.02 of the third resource type have been created by resource manager 219 and ME 209 in interoperation. Computer system 204 comprising processor 220, memory 221 and storage medium 248 runs a resource manager 222 being operable to instantiate and manage a resource of a fourth resource type, whereby according to the depicted system state, 5 instances of the 4th resource type have been created.

FIG. 2 shows the allocation of various resource instances to the respective services by means of dotted lines. For example, an instance RI.03 of the first resource RI, an instance RII.01 of the second resource RII and an instance RIII.01 of the third resource RIII collectively constitute IT-service 228. According to other implementation variants (not shown), the resource managers 214, 219, 222 may run on one or more other computer systems, e.g. on a computer system 202, on the computer system 201 hosting the ME 209, or on a computer system 205, 206 hosting the IT-services. The instantiation of a resource is respectively accomplished by the ME 209 interoperating with a resource manager 214, 219 222. Correspondingly, executing various methods of existing resource instances and the deletion of individual resource instances is also accomplished by the ME in interoperation with the respective resource manager of the resource instance, whereby said interoperation is based on a loose coupling/a binding of ME and resource manager at runtime.

Figure 3:
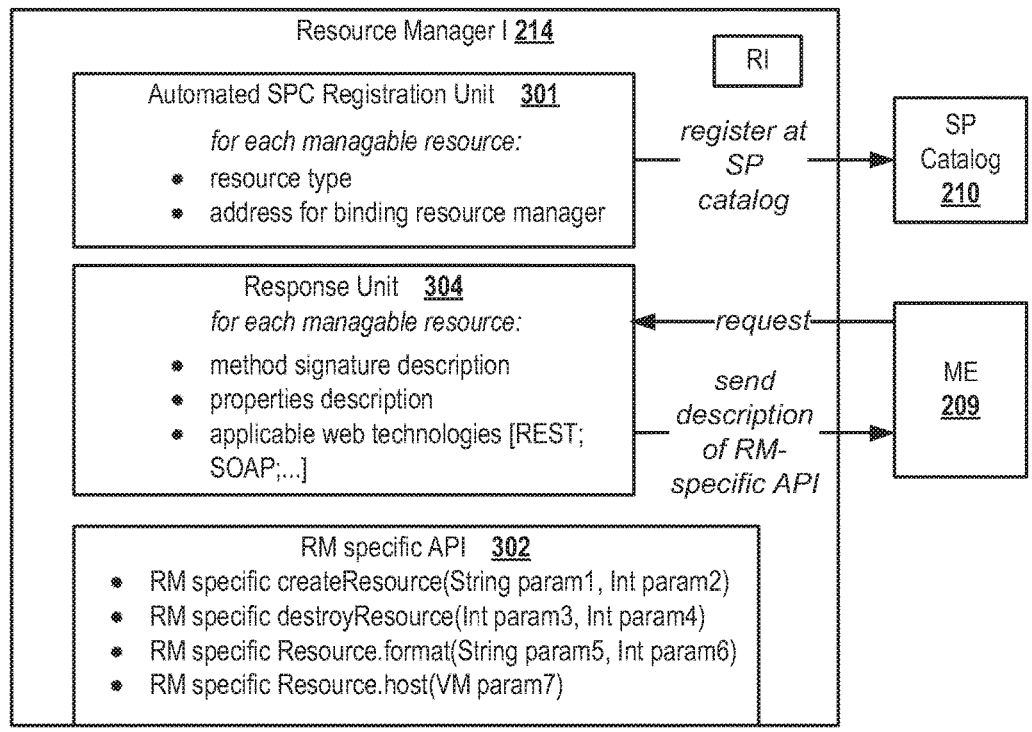
FIG. 3 illustrates modules of one of the resource managers in greater detail.

FIG. 3 depicts resource manager 214 in greater detail. The resource manager comprises an automatic service provider catalog registration unit 301. Said unit is operable to automatically, upon deploying the new resource manager to the IT-service management system, add a new entry to the service provider catalog 210, thereby registering the new resource manager at the service provider catalog. The new entry comprises, for each resource type manageable by the resource manager 214, information on the resource type managed and on an address for binding the resource manager. The resource manager comprises a response unit 304 being operable to receive a request from the ME 209 and to send, for each manageable resource, a description of the methods and parameters 505 of the resource manager specific API. In addition, a description of the transmission protocol is sent to the ME for enabling the ME to interoperate with the resource manager 214 via the resource manager specific API 302. The resource manager specific API 302 may expose several concrete methods for creating a resource, and for managing and destroying instances of said resource.

Figure 4:
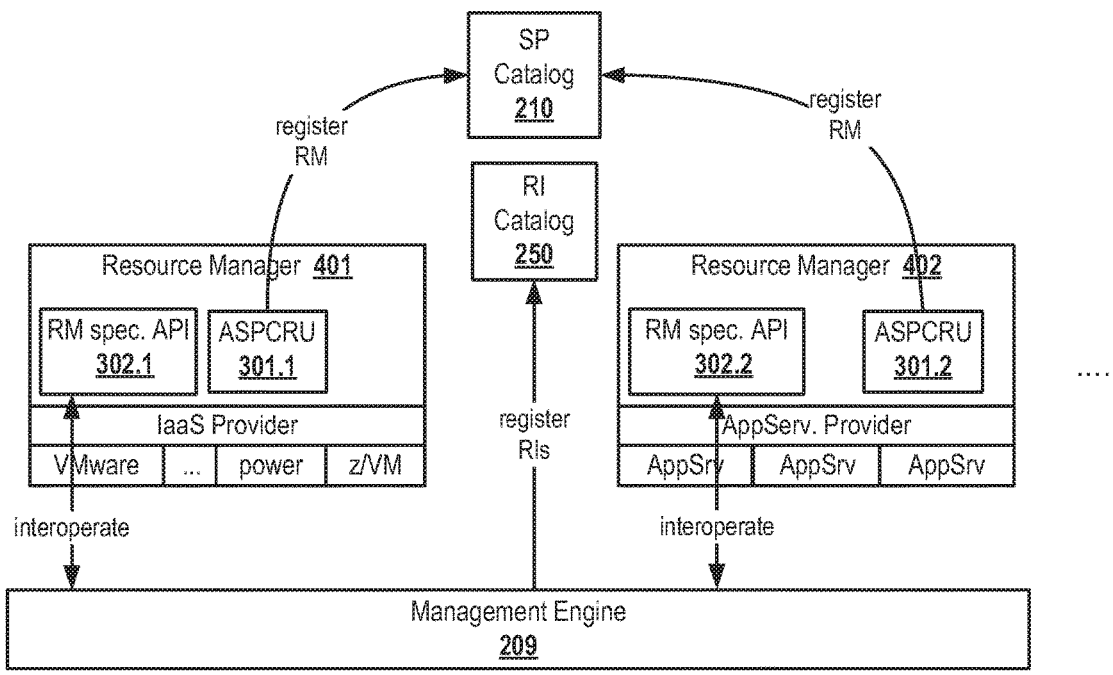
FIG. 4 is a block diagram of resource managers automatically registering at a service provider catalog.

FIG. 4 depicts two resource managers 401, 402 operable to automatically register, upon deployment to the IT-service management system, at the service provider catalog 210 via their respective automated service provider catalog registration unit 301.1, 301.2. The resource managers 401, 402 respectively expose a resource manager specific API 302.1, 302.2. API 302.1 allowing the instantiation and allocation of resources to IT-services for providing infrastructure as a service. Said resources may relate to a plurality of different resource types such as VMware, processing power, virtual machines, and the like. API 302.2 allows to instantiate an allocate resources for providing one or more application servers as a service. The ME 209 is operable to update a resource instance catalog 250 each time a resource is instantiated and each time a resource instance is destroyed by executing a corresponding 'create' or 'destroy' abstract method of the generic API being overwritten by a concrete method of the respective resource manager specific APIs 302.1, 302.2.

Figures 5, 6:
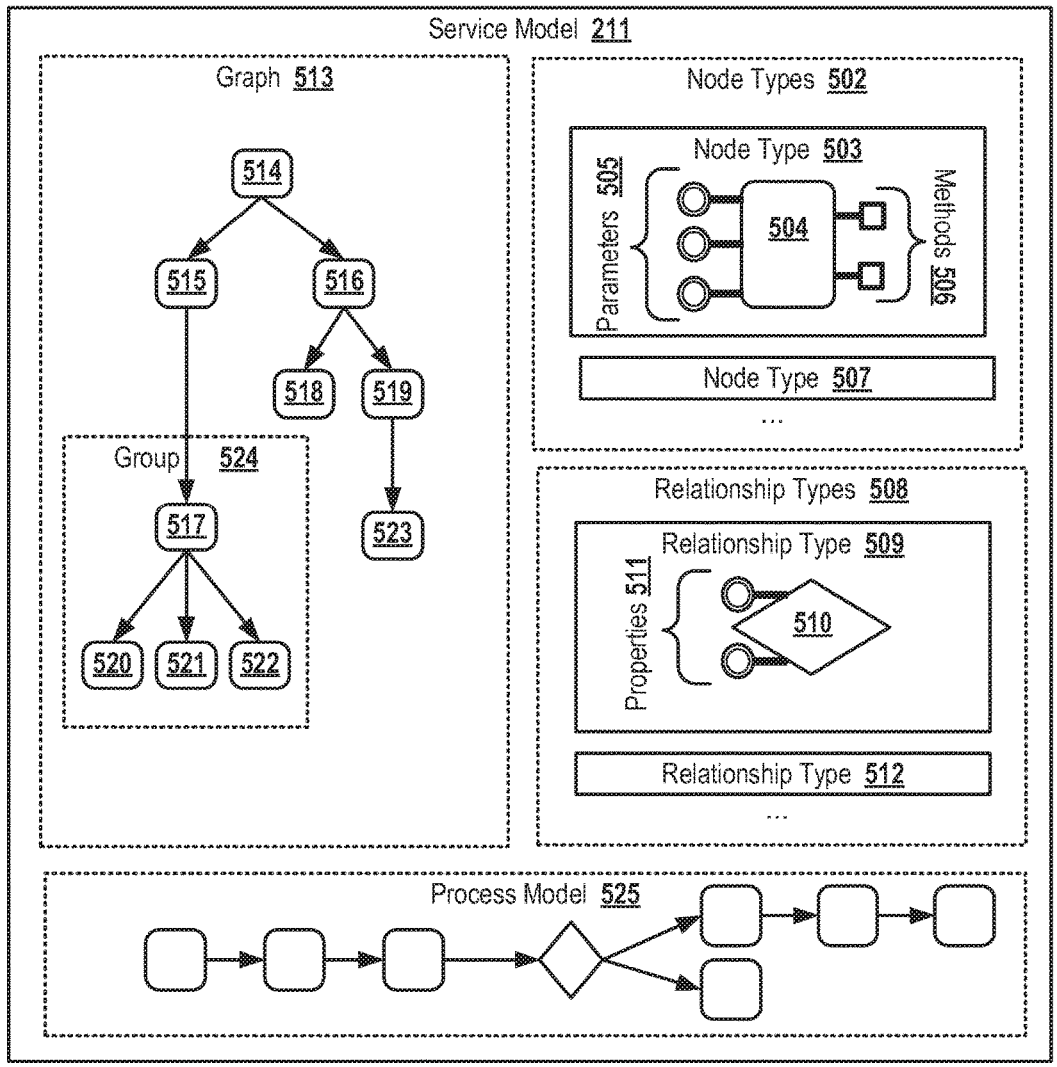
FIG. 5 is a schematic illustration of a service model.
FIG. 6 depicts a service provider catalog implemented as database table.

FIG. 5 depicts the service model 211 in greater detail. The service model comprises a graph of nodes 514-523, whereby each node represents one of the resources RI-MV managed by the resource managers 214, 219, 222. According to some embodiments, nodes of the graph may be categorized as being member of one or more groups 524. The group 524 of nodes may have assigned one or more group rules R3, R4. Service model 211 comprises a specification 502 of all node types 503, 507 representing a resource type necessary for instantiating an IT-service. Each specification of a node type 503 comprises a name 504 of the node for mapping the node to a respective resource type, one or more parameters 505 and one or more methods 506. The parameters and methods are specified in accordance with the generic API. By mapping the parameters and methods of the generic API to concrete parameters and methods of a resource-manager-specific API of a selected resource manager, the ME is operable to dynamically bind to said resource manager and to exploit its management capabilities for instantiating a required resource. Further, the service model comprises a specification 508 of one or more relation types 509, 512. Each relation type RT-X comprises a specification of a name 510 of the relation type and one or more properties 511 of the relation type. Said relation types may be indicative of the chronological sequence according to which the ME is required to instantiate the resources specified in the service model and/or may be indicative of the roles 'host'/'hosted entity' of the resource instances connected to each other by an edge having assigned the respective relation type. According to some embodiments, the service model may further comprise a process model 525 being indicative of the chronological sequence to be followed by the ME when instantiating the resources constituting the IT-service. In this case, the topology of the graph 513 needs not to specify the chronological sequence.

The binding of abstract methods of the generic API at runtime of the IT-service management system to concrete methods of a resource-manager-specific API can be specified e.g. as follows: The service model may be defined in the form of an XML document, for example according to the TOSCA standard. The structure of an IT-service, its topology, is defined as a TopologyTemplate within the service model ('ServiceTemplate'). Inside the TopologyTemplate, a graph of nodes, herein referred to as 'NodeTemplates' connected via edges ('RelationshipTemplates') defines instances of resources of specific types (indicated via the 'nodeType' attribute of a node) that are related to each other via special kinds of relationships (indicated via the relationshipType attributes of the edges). In the depicted example a VirtualMachine node is connected to a StorageVolume node:

```
<ServiceTemplate id="SampleServiceTemplate"
...
xmlns:ex="http://www.example.com/SampleDefinitions">
<TopologyTemplate id="SampleTopologyTemplate">
<NodeTemplate id="VM" nodeType="ex:VirtualMachine">
<PropertyDefaults>
...
</PropertyDefaults>
</NodeTemplate>
<NodeTemplate id="Storage" nodeType="ex:StorageVolume">
<PropertyDefaults>
<ex:StorageVolumeProperties>
<ex:Size>40</ex:Size>
<ex:RaidLevel>6</ex:RaidLevel>
...
</ex:StorageVolumeProperties>
</PropertyDefaults>
</NodeTemplate>
<RelationshipTemplate id="rel1"
relationshipType="ex:ConnectsTo">
<SourceElement id="VM"/>
<TargetElement id="Storage"/>
</RelationshipTemplate>
</TopologyTemplate>
...
</ServiceTemplate>
```

Node types and relationship types can define also the properties that respective nodes and edges can have. This is done by means of XML schema definitions referenced by the Node Type and Relationship Type definitions. Nodes and edges in the service model can comprise parameter values in the PropertyDefaults XML element. The MEs may use said property defaults when instantiating the respective resources. For each node ('NodeTemplate') a service provider catalog is evaluated for determining resource managers that support the respective node type as indicated by the node type attribute of the Node Template. Then, one resource manager is selected from the list returned from the service provider catalog and an address for the selected resource manager is obtained. In response to a request to said address, a description of the Node Type, including concrete descriptions of operations for that Node Type are received. The ME evaluates the returned description to find out the resource manager specific, concrete method for said abstract method and to construct a call for instantiating the resource to the resource manager specific API. An example of a definition of a Node Type being enriched with information on the concrete "Create" method as specified in the received description is given below:

```
<NodeType id="VirtualMachine">
<Interface>
<Operation name="Create">
<REST method="POST"
abs_path="http://10.10.10.123:9080/VirtualMachine">
<Parameters>
<Parameter name="num_cpu" required="yes"> <Source
ref="ex:VirtualMachineProperties/NumCpus"/> </Parameter>
<Parameter name="mem" required="yes"> <Source
ref="ex:VirtualMachineProperties/MemorySize"/> </Parameter>
</Parameters>
</REST>
</Operation>
</Interface>
</NodeType>
```

The XML snippet above shows how the abstract "Create" operation has to be invoked for the specific selected resources manager via a REST interface by sending an HTTP POST call to the URL indicated via the abs_path attribute of the REST element.

FIG. 6 depicts a service provider catalog 210 according to an embodiment of the invention. The service provider catalog may be implemented as a table in a relational database comprising multiple columns for the resource managers name 601, the resource type 602 and an address of the resource manager, the address enabling the ME to request the description of the resource-manager specific API. Upon adding a new resource manager to the IT-service management system 200, a ('database entry') is added to the table. For example, upon adding a resource manager for the Websphere application server to the IT-service management system, a new entry is added to the database table comprising, for example, an IP address of the server hosting the new resource manager.

Figure 7:
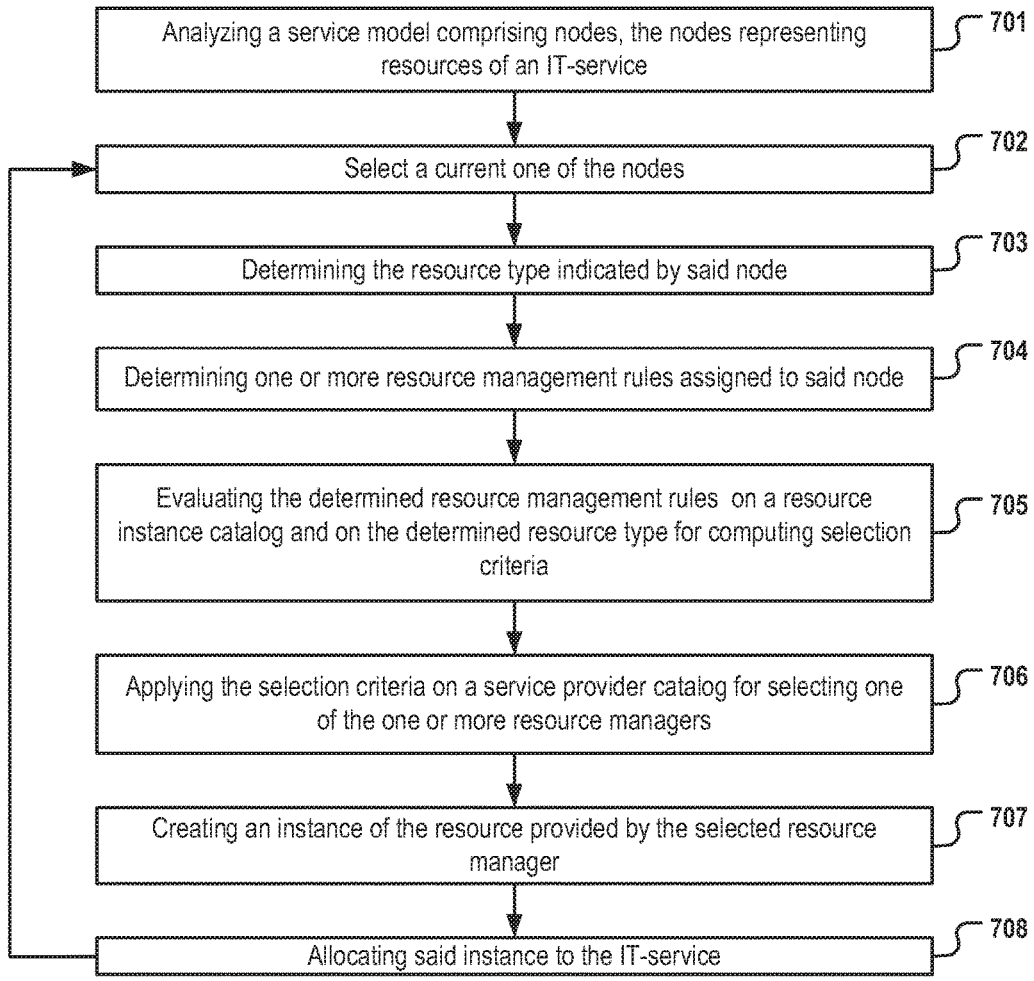
FIG. 7 is a flowchart of a method for allocating resource instances.

FIG. 7 is a flowchart of a method for allocating resource instances to an IT-service. In step 701 the ME analyzes a service model. The service model comprises a plurality of nodes respectively representing a resource of an IT-service whose structure is specified by the service model. In step 702, a current one of the nodes is selected for determining, in step 703, the resource type of the resource represented by said current node. In step 704, one or more resource management rules assigned to said node are determined. The assignment of rules to said node may be specified directly, e.g. as an annotation to said node, or indirectly, by an annotation of a node group comprising the current node, whereby said node group is assigned with one or more group rules. The determined rules are evaluated in step 705 by the ME on a resource instance catalog and the determined resource type for computing selection criteria. In step 706, the selection criteria are applied on a service provider catalog for selecting one of the one or more resource managers listed in said service provider catalog as being operable to provide a resource of the required resource type. In step 707, an instance of the resource is created by the ME interoperating with the selected resource manager. In step 708, the instantiated resources allocated to the IT-service. Steps 702-708 may be repeated until all nodes in the service model have been evaluated and the instantiation of the IT-service has been completed.

According to embodiments, an instance of a resource may be created automatically in case the load characteristic exceeded a threshold. Alternatively, the instantiation of a new IT-service by the management system may trigger the instantiation of one or more resources. A new IT-service may be instantiated e.g. upon deploying a new service model to the IT-service management system, e.g. by deploying the service model to the management system 200. The ME may check if the current node is a multi-instance node. If so, the ME may further determine if multi-instance rules, e.g. anti-collocation or collocation rules, are assigned to the current node. If this is not the case, other management rules assigned to said node may be evaluated on the resource instance catalog, if applicable. If a MIR-rule, e.g. an anti-collocation rule or collocation rule is assigned, the ME checks if an entry for a resource instance of the RT-X resource type of the current node already exists according to the resource instance catalog. If this is not the case, selection criteria are calculated according to which anyone of the resource managers providing a resource of type RT-X can be selected. If, however, at least one instance of said resource is determined to exist, the ME calculates selection criteria according to which the resource manager having already provided said existing RT-X resource instance(s) instance must be selected. After having instantiated a resource, the ME updates the resource instance catalog.

Figure 8:
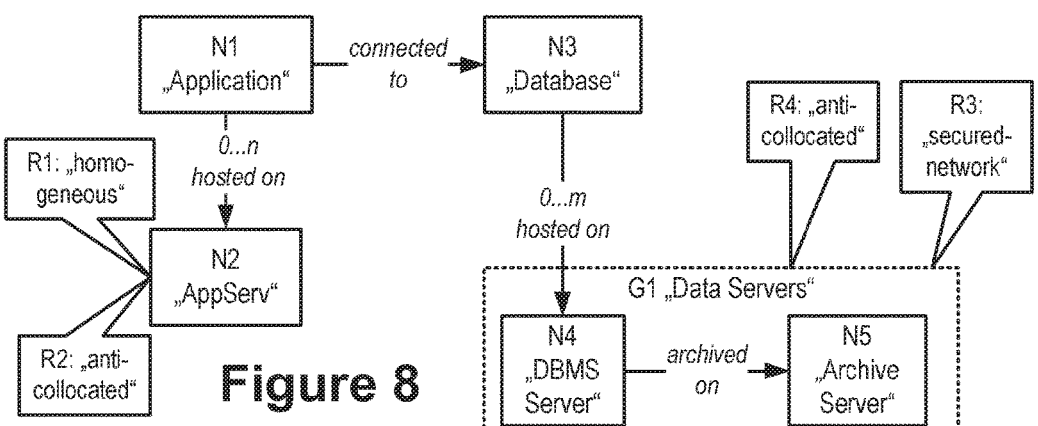
FIG. 8 is a block diagram of elements of a service model.

FIG. 8 depicts components of a service model comprising 5 nodes N1-N5 respectively representing one or more resource instances connected to each other in accordance with edges of different relationship types ('connected to', 'hosted on', 'archived on'). One instance of a resource represented by node N1, e.g. an application program, may be hosted by on one or more (n) Application Servers respectively being an instance of resource of node N2. Each instance of resource of node N1 may be connected to an instance of the resource (a database) represented by node N3. Said database may be hosted in 0, . . . , m instances of a DBMS Server, the DBMS server being represented by resource N4, n and m being integers larger than 0. Said DBMS server is archived on an instance of a node N5 representing an archive server resource. Nodes N4 and N5 constitute a group G1 of nodes having assigned group rules R3 and R4, R3 and R4 being applicable on all instances of the nodes N4 and N5 whose represented resource instances collectively provide for a "Data Server".

In one aspect, the invention relates to a computer-implemented method for instantiating one or more resources of an IT-service. Each resource is of one of one or more resource types. Each resource is provided by one of one or more resource managers of an IT-service management system.

The method comprises: analyzing, by a management engine, a service model of said IT-service, the service model comprising nodes respectively representing one of the resources and respectively being indicative of a resource type of said represented resource, each of the nodes comprising a generic API, the generic API not being specific to any particular one of the resource managers and providing at least one abstract method for instantiating the resource represented by the respective node; and for each of the nodes, executing, by the management engine, at runtime of the IT-service management system: determining the one of the one or more resource types being indicated by said node; evaluating a service provider catalog, the service provider catalog being indicative of one or more of the resource managers respectively being operable to provide a resource of a given resource type, for determining one or more of the resource managers respectively being operable to provide a resource having the determined resource type, and for determining an address of each of said determined one or more resource managers; selecting one of the one or more resource managers; sending a request to the address of the selected resource manager, the request being a request for a description of a resource-manager-specific API of said resource manager; receiving the requested description from the selected resource manager; overriding said at least one abstract method by a resource-manager specific method of the resource-manager-specific API for instantiating said resource, said resource-manager specific method being specified in the received description; and executing the overridden at least one abstract method for instantiating the resource represented by said node.

Embodiments of the present disclosure enable translation of the abstract methods of the generic API at runtime of the IT-service management systems into concrete methods of the respectively used resource manager. Thus, it is also possible to dynamically select the resource manager to be used for instantiating the resources for instantiating the IT-service at runtime of the IT-service management system. Thus, a high degree of flexibility is provided, as the management engine and the plurality of resource managers are only loosely coupled. Exchanging a particular resource manager thus does not require amending the service model as the service model comprises only a generic API. If, for example, a first resource manager provided by a first vendor and having a first proprietary API is replaced by a second resource manager provided by another vendor and having a second proprietary API for instantiating the same resource type as provided by the first resource manager, no changes need to be introduced in the service model. In case the service management system comprises multiple different resource managers providing the same type of resource, it is possible to dynamically decide which one of the resource managers shall be used for instantiating a respective resource. For example, if both a first and a second resource manager respectively provide for a resource type 'application server', the first resource manager providing JBoss applicaton servers while the second resource manager provides WebSphere application servers, it is possible to decide at runtime of the IT-service management system (e.g., based on current load characteristics), which of the resource managers to select for instantiating a resource. Thus, embodiments of the invention provide for a highly generic, flexible IT-service management system and method allowing decoupling the management engine from any proprietary API of the respective resource managers, thereby easing the operability and maintainability of the IT-service management system.

According to some embodiments, the selection of the one resource may be implemented by management rules being operable to evaluate, at runtime of the IT-service management system, some parameter values for determining which one of the resource managers operable to instantiate the requested resource should be selected. Said parameter values may indicate a current load characteristic of a resource manager, a predefined preference for a particular resource manager, the existence of one or more other resource instances provided by a particular resource manager, or the like.

According to some embodiments, the nodes are nodes of a graph. Analyzing the service model comprises traversing the graph for instantiating the resources represented by said graph's nodes in accordance with the topology of said graph. According to some embodiments, the traversal is started at the leaf nodes. Said features are advantageous, as a service may be specified by means of said service model in a completely generic manner. In case a new resource manager is added to the IT-service management system or replaces another resource manager providing the same resource type, the service model does not have to be amended as it does not comprise any elements of a resource manager specific API. In addition, representing the resources as nodes of a graph allows specifying one or more relationships types connecting two resources, e.g. a relationship type indicating that one resource needs to be instantiated before another. For example, at first an application server resource needs to be instantiated before an application program to be deployed in said application server and acting as a resource of type 'application program' can be instantiated.

According to some embodiments, the service model is indicative of a chronological sequence of the resources to be instantiated. Said sequence is specified by means of a topology of a graph comprising the nodes or being specified by means of a process model contained in the service model. Said features are advantageous as the management engine traversing the graph in accordance with the topology of the graph may automatically retrieve the nodes in the order the respective resources represented by said nodes need to be instantiated.

According to some embodiments, the nodes of each pair of connected nodes of the graph are connected to each other by means of one or more edges. Each edge represents one of one or more relationship types. At least one relationship type 'depends-on' represents a dependency between a first resource represented by a source node and a second resource represented by a destination node. The first resource represented (e.g., by a leaf node) needs to be instantiated before the second resource in case the second resource 'depends on' the first resource. The edges representing said relation type may be directed for providing a directed graph topology determining the chronological sequence according of the resources to be instantiated. According to some embodiments, at least some of the edges represent a further relation type 'hosted-on', said relation type specifying which one of a pair of resources acts as host of the other resource. Said kind of relation type may enable the management engine to automatically deploy a resource upon its instantiation at another resource specified by said relation type as the 'host'.

According to some embodiments, the method further comprises, at runtime of the IT-service management system: adding a further resource manager to the IT-service management system, the further resource manager being adapted to provide resources of a further resource type; and as a consequence of said adding, adding a further entry to the service provider catalog, the further entry being indicative of the further resource manager, the further resource type and of an address of the further resource manager. The further entry may be added to the service provider catalog fully automatically, manually or semi-automatically. The further resource manager may be added to the IT-service management system (e.g., by deploying a war file). Said features may be advantageous as the operator does not have to manually enter the address of the resource-manager into the service provider catalog for enabling the management engine to interoperate with the resource manager. According to embodiments the adding of the further entry is executed in accordance with the Open Services for Lifecycle Collaboration (OSLC) technology.

According to some embodiments, the nodes comprise at least a first and a second node. The first node represents a first resource of a first resource type. The second node represents a second resource of a second resource type. The first and second resource types differ from each other and are respectively selected, in any combination, from a group comprising: a data storage resource type for providing data storage as a service (StaaS), wherein the data storage resource type may cover, for example, SAAS storage media, SAS storage media, FLASH storage media, and the like; an application program resource type for providing software as a service (SaaS), wherein the application program resource type may cover any kind of program or software module; an example of a Saas resource is Google Docs and Apple iWork.com; a computing resource type for providing infrastructure as a service (IaaS), wherein a computing resource type may cover, for example, a 'Virtual Machine (VM)', a 'processing unit', or the like; a networking component resource type for providing network as a service (NaaS) may cover, for example, a router; and a middleware component resource type for providing platform as a service (PaaS).

According to some embodiments, instantiating the resource by executing the at least one abstract method is executed by the management engine interoperating with the selected resource manager. The interoperation is executed via the obtained resource-manager-specific API. Thus, the management engine is enabled to make full use of the functionalities provided by the resource manager for instantiating and controlling a resource, but nevertheless the management engine is not tightly coupled to the management engine.

According to some embodiments, the generic API comprises further abstract methods for controlling and/or deleting an instance of the resource represented by said node. The method further comprises: overriding said further abstract methods by a respective resource-manager specific method of the resource-manager-specific API; and executing the overwritten generic API by the management engine, whereby the management engine interoperates with the selected resource manager, wherein the interoperation is executed for controlling and/or deleting said instance. The interoperation may comprise calling the resource-manager specific method via the resource-manager specific API in accordance with the description.

According to some embodiments, the description received from one of the resource managers comprises one or more concrete methods for respectively overriding an abstract method of the generic API and comprises a specification of one or more transmission protocols which can be dynamically chosen and used by the management engine for interacting with said one resource manager.

According to some embodiments, the method further comprises: evaluating, by the management engine, the received description for determining a data transmission protocol to be used by the management engine for interoperating with the determined resource manager; and/or determining one or more API methods and API parameters to be used by the management engine for interoperating with the determined resource manager. The interoperation is executed by the determined transmission protocol and/or by the determined API methods and API parameters. Said features may be advantageous as the transmission protocol, e.g. remote procedure calls or the like, may be determined dynamically upon selection of the resource manager. Thus, the management engine and the resource managers do not have to "agree upon" a particular, predefined and hard-wired transmission protocol, but may chose an appropriate transmission protocol dynamically in dependence on the selected resource manager/the received description of the resource manager specific API. By determining the resource manager specific API dynamically via the description, the management engine is enabled to directly call the concrete methods of the resource manager specific API. According to some embodiments, the resource manager specific API comprises more concrete methods than abstract methods exist in the service model for the respective resource type, but only those concrete methods which were successfully mapped to a corresponding generic method can be executed by the management engine.

According to some embodiments, the evaluation is executed at runtime of the data management system for dynamically determining the transmission protocol to be used by the management engine for interacting with the resource manager. Thus, the abstract method is not invariantly bound to a particular transmission protocol, i.e., is not bound to any REST, SOAP, RPC protocol etc. The binding of any abstract method of the generic API is executed dynamically after having selected a concrete resource manager for instantiating the requested resource type. Said loose, dynamic binding of the transmission protocol may greatly increases the flexibility of the system.

According to some embodiments, an IT-service management system comprises at least a first and a second resource manager. The first resource manager comprises a first resource-manager specific API and is operable to provide a first resource of a first resource type. The second resource manager comprises a second resource-manager specific API and is operable to provide a second resource of a second resource type. The method further comprises: instantiating at least the first resource via the first resource manager specific API by a first set of API methods and API parameters and/or by a first data transmission protocol; and instantiating at least the second resource via the second resource manager specific API by a second set of API methods and API parameters and/or by a second data transmission protocol.

In some embodiments, the invention relates to a computer readable storage medium comprising program instructions which, when executed by a processor, cause the processor to execute the computer-implemented method according to any one of the presently disclosed embodiments.

In some embodiments, the invention relates to a computer implemented method for instantiating a resource. The computer system comprises a resource manager being adapted for: upon deployment of a resource manager to an IT-service management system, adding an entry to a service provider catalog of the IT-service management system, the further entry being indicative of the resource manager, of a resource type provided by said resource manager, and of an address of the resource manager, where said adding may be executed fully automatically, manually or semi-automatically; upon receipt of a request from a management engine of the IT-service management system, sending a description of a resource manager-specific API to the requesting management engine, the resource manager-specific API comprising at least one resource-manager specific method for instantiating said resource, wherein the entry enables the management engine having access to the service provider catalog to send, at runtime of the data processing system, the request to the address of the resource manager; and for interoperating with the management engine by means of the resource manager-specific API for instantiating the resource. Said features may be advantageous as the further resource manager may automatically or user-interactively register itself at the service provider catalog. Thus, any delays and errors caused by a manual entry of the further resource manager's address is prevented and an IT-service management system is provided allowing to use any of the resource managers as dynamically removable and/or addable plug-in modules of the IT-service management system. The resource manager may be adapted for receiving the request from the management engine and for sending, in response to the request, a description of its resource-manager-specific API.

In some embodiments, the invention relates to a computer system comprising a management engine for instantiating one or more resources of an IT-service. Each resource is of one of one or more resource types. Each resource is provided by one of one or more resource managers of the IT-service management system. The management engine is adapted for: analyzing a service model of said IT-service, the service model comprising nodes respectively representing one of the resources and respectively being indicative of a resource type of said represented resource, each of the nodes comprising a generic API, the generic API not being specific to any particular one of the resource managers and providing at least one abstract method for instantiating the resource represented by the respective node; and for each of the nodes, executing, at runtime of the IT-service management system: determining the one of the one or more resource types being indicated by said node; evaluating a service provider catalog, the service provider catalog being indicative of one or more of the resource managers respectively being operable to provide a resource of a given resource type, for determining one or more of the resource managers respectively being operable to provide a resource having the determined resource type, and for determining an address of each of said determined one or more resource managers; selecting one of the one or more resource managers; sending a request to the address of the selected resource manager, the request being a request for a description of a resource-manager-specific API of said resource manager; receiving the requested description from the selected resource manager; overriding said at least one abstract method by a resource-manager specific method of the resource-manager-specific API for instantiating said resource, said resource-manager specific method being specified in the received description; and executing the overridden at least one abstract method for instantiating the resource represented by said node.

According to some embodiments, the computer system further comprises the one or more resource managers, the service provider catalog, and a mechanism (e.g., a management engine) for adding, upon deployment of a further resource manager to the IT-service management system, a further entry to the service provider catalog, whereby said adding may be executed automatically, manually (e.g. by an operator of the system) or semi-automatically. The further entry is indicative of the further resource manager, the resource type provided by said further resource manager, and an address of said further resource manager. The further entry enables the management engine having access to the service provider catalog to send, at runtime of the IT-service management system, the request to the further resource manager.

In some embodiments, the invention relates to a computer system comprising a resource manager being adapted to execute a method as described above in respect to embodiments of the invention relating to the resource manager. According to some embodiments, the resource manager specific API is further used by the management engine for managing and deleting resource instances in interoperation with the resource manager. According to some embodiments, the IT-service is provided by one resource instance or a plurality of resource instances. In case the IT-service is provided by a plurality of resource instances, said instances may be of the same or of different resource types.

According to some embodiments, the data transmission protocol used by at least one of the resource managers is a REST web service protocol, a SOAP protocol, a SNMP protocol, a WS-management protocol, or a remote procedure interface protocol. Different resource managers of the IT-service management system may respectively employ different data transmission protocols, and some resource managers may offer two or more different transmission protocols for enabling the management engine to interact with the resource manager for instantiating and/or managing a resource.

In some embodiments, the invention relates to a computer-implemented method for allocating one or more instances of one or more resources to an IT-service. Each resource is of one of one or more resource types. Each resource instance is provided by one of one or more resource managers of an IT-service management system. The method comprises: analyzing, by a management engine, a service model, the service model specifying the structure of an IT-service and comprising nodes respectively representing one of the resources and respectively being indicative of a resource type of said represented resource, the service model further comprising, for at least one of the nodes, one or more resource management rules specifying the management of said resource represented by said node; and for each of the nodes, executing, by the management engine, at runtime of the IT-service management system: determining the resource type indicated by said node; determining one or more resource management rules assigned to said node; evaluating the resource management rules assigned to said node on a resource instance catalog and the determined resource type, wherein the resource instance catalog is indicative of all currently existing instances of the one or more resources and their respective allocation to said IT-service for computing selection criteria; applying the selection criteria on a service provider catalog for selecting one of the one or more resource managers, the service provider catalog being indicative of one or more of the resource managers respectively being operable to provide a resource instance of a given resource type to the IT-service; creating an instance of the resource provided by the selected resource manager; and allocating said instance to the IT-service. Said features may be advantageous, as by evaluating a resource instance catalog being indicative of the number and type of currently instantiated resources for determining which kind of resource manager to choose for instantiating a new resource instance it is possible to dynamically adapt the resource instantiation procedure to dynamically determined runtime parameter values of the IT-service management system. Said features may enable to selectively instantiate resources by a resource manager having already provided at least one resource of a given type. For example, in many use case scenarios it may be advantageous to instantiate a node of type 'application server' by a resource manager adapted for providing a Web Sphere application server and not by a resource manager adapted for providing a Glassfish web server in case an instance of the WebSphere application server already exists. Depending on the embodiments and the used management rules, new resources may be instantiated in a way that they are collocated (hosted together') with already existing resources of a given resource type in the same runtime environment or that they are respectively instantiated in different runtime environments (anti-collocation). The runtime environment may also act as a resource and may be represented in the form of a node in the service model. Thus, a highly flexible and dynamic IT-service management system is provided being operable to dynamically select one resource manager out of a plurality of resource managers for instantiating a resource in dependence on runtime parameter values of the IT-management system, in particular, in dependence on the number, type and/or parameter values of already existing resource instances as indicated in the resource instance repository.

According to some embodiments, the resource instance catalog comprises, for each of the instantiated resources, a load characteristic, the load characteristic being indicative of a processing load of the instantiated resource. The method further comprises: monitoring, by the management engine, the load characteristic of each of the one or more resource instances allocated to said IT-service; updating, by the management engine, the load characteristic of said one or more resource instances with the monitored load characteristics; upon evaluation of the resource management rules on the resource instance catalog, executing the evaluation also on the updated load characteristic of said one or more resource instances. Said features may be advantageous as they may allow increasing the performance and/or reliability of the IT-service. In case it is determined that an IT-service or one of its resource instances is requested/accessed too frequently, e.g. in case the number of requests per time exceeds a given threshold, an additional instance of said application server and application program may be created as a further component of the IT-service to reduce the processing load of the IT-service and/or to reduce the processing load one of its resource instances.

According to some embodiments, the resource management rules are stored as annotations to nodes or as annotations to groups of nodes in the service template.

In some embodiments, each of the nodes comprises a generic API. The generic API is not specific to any particular one of the resource managers and provides at least one abstract method for instantiating the resource represented by the respective node. The creation of the instance of the resource comprises: evaluating, by the management engine, the service provider catalog for determining an address of the selected resource manager; sending, by the management engine, a request to the address of the selected resource manager, the request being a request for a description of a resource-manager-specific API of said resource manager; receiving, by the management engine, the requested description from the selected resource manager; overriding, by the management engine, said at least one abstract method by a resource-manager specific method of the resource-manager-specific API for instantiating said resource, said resource-manager specific method being specified in the received description; and executing the overridden at least one abstract method for instantiating the resource represented by said node. Said execution may be performed by the management engine in interoperation with the selected resource manager.

According to some embodiments, the nodes are nodes of a graph. Each of the nodes is of a single-instance-node type or of a multi-instance node type. A multi-instance node represents a resource being instantiable multiple times. A single-instance node represents a resource being instantiable only once. Analyzing the service model comprises traversing the graph for instantiating the resources represented by said graph's nodes in accordance with the topology of said graph and in accordance with the node's respective node type. Annotating nodes with a multi-instance or single-instance property may by advantageous as said feature may allow for a more fine-grained specification of management rules and an acceleration of the evaluation. For example, in case a node is determined to be a single-instance node, all rules being applicable selectively to multi-instance nodes may be skipped during the evaluation of the management rules, thereby increasing the speed of the evaluation.

According to some embodiments, the management rules comprise a rule being adapted to evaluate load characteristics assigned to all existing resource instances of all resources having the resource type indicated by a currently evaluated node of the service model. In case the load characteristics exceed a threshold value specified in the rule, an additional node instance may be initiated, whereby additional management rules may be evaluated for calculating selection criteria for selecting an appropriate resource manager.

According to some embodiments, at least one of the nodes is a multi-instance node. The resource management rules comprise multi-instance resource (MIR) rules providing for a concerted management of multiple instances of the resource represented by said node. At least one of the nodes has assigned one or more MIR rules. The method comprises, for each of the nodes: evaluating if the node is a multi-instance node; in case the node is a multi-instance node, evaluating at least the one or more assigned MIR rules on the resource instance catalog for determining if other instances of the resource represented by said node already exist; the resource instance catalog is indicative of the existence of said other instances and may optionally also be indicative of parameter values of said other existing instances. The selection criteria are computed in dependence on an evaluation result of the MIR rules.

According to some embodiments, the MIR-rules comprise at least one anti-collocation rule. The anti-collocation rule specifies that all instances of a resource collectively providing the IT-service or a sub-service of said IT-service must respectively be instantiated in different runtime environments. The evaluation of the anti-collocation rule comprises: determining if one or more first resource instances provided by one of the resource managers exist and are allocated to the IT-service or a sub-service thereof; and if one or more of said instances exists, the computation of the selection criteria returns selection criteria being adapted to select said determined resource manager for creating at least one further instance of the resource of said resource manager in a runtime environment currently not hosting any of the one or more existing resource instances. If none of said instances exists, the resource manager can deploy the new resource instance to any of the available runtime environments.

According to some embodiments, the MIR-rules comprise at least one collocation rule, the collocation rule specifying that all instances of a resource collectively providing the IT-service or a sub-service of said IT-service must respectively be instantiated in the same runtime environment. The evaluation of the collocation rule comprises: determining if one or more first resource instances provided by one of the resource managers exist and are allocated to the IT-service or a sub-service thereof; and if one or more of said instances exists, the computed selection criteria are adapted to select said determined resource manager for creating at least one further instance of the resource of said resource manager selectively in a runtime environment currently hosting all said one or more existing resource instances.

According to some embodiments, nodes of a group of two or more of the nodes represent resources whose respective instances collectively provide the IT-service or a sub-service of said IT-service, wherein said represented resources are of the same or a different resource type, wherein the resource management rules comprise group rules providing for a concerted management of the instances of a group of resources represented by said group of nodes. At least one node group has assigned one or more groups rules. The method comprises, for each of the nodes of the service model: determining a group of nodes the currently examined node is member in; if the group of nodes could be determined, determining one or more group rules assigned to said group of nodes; evaluating at least the determined group rules on the resource instance catalog for determining if resource instances represented by other ones of the two or more nodes already exist, the resource instance catalog being indicative of the existence of said other instances and optionally also being indicative of parameter values of said other instances. The selection criteria are computed in dependence on an evaluation result of the group rules.

In some embodiments, one of the group rules is a collocation rule specifying that all resource instances of resources being represented by member nodes of said node groups must be instantiated and hosted on the same resource instance. Thus, in case said collocation rule applies, the first instance of any resource of said resource group may be instantiated by an arbitrary one of the resource managers operable to instantiate the respective resource type. However, for any second/further resource instance of said group, the selection criteria are calculated in a way ensuring that said resource manager is again used for instantiating the second/further resource instance on the same resource instance hosting already the first resource instance. According to embodiments one of the group rules is an anti-collocation rule acting analogously for the node groups comprising mixed resource types as described above for the multi-instance nodes representing instances of the same resource type.

According to some embodiments, one of the group rules specify that all instances of a resource of said group of resources must respectively be instantiated in a way enabling the resources of said group to fulfill one or more requirements. The requirements may concern the resource to be instantiated and/or may concern the runtime environment to host the resource instance. The evaluation of the one or more group rules assigned to said group of nodes results in a determination of selection criteria for selecting a resource manager being operable to instantiate a resource in a way that the requirements are fulfilled. Said features are advantageous as they allow to specify automatically executable instantiation and management workflows wherein requirements and constrains apply not only to individual resource instances or instances of the same resource but also to multiple instances of resources of different resource types and/or provided by different resource managers.

According to some embodiments, the group rules comprise a homogeneous-security-environment rule, said rule comprising the requirement to instantiate all resources represented by nodes of a given node type in the same security realm, e.g. within a network of servers or within an application server fulfilling a particular security requirement. According to some embodiments, said requirements are selected from a group comprising, in any combination: all instances of resources being member in said group must be instantiated within the same network security zone; all instances of resources being member in said group must fulfill one or more security constraints; all instances of resources being member in said group must be instantiated or hosted within a given geographical location; and the runtime environment used for hosting the instances of the resources being member in said group must meet some security constraints.

Examples of possible network security zones are the Internet (uncontrolled zone) outside the boundaries of an organization, the Internet DMZ (controlled zone) being an Internet-facing controlled zone that contains components with which clients may directly communicate, a production network (restricted zone) supporting functions to which access must be strictly controlled, an Intranet (controlled zone) behind one or more firewalls and management network (secured zone). Geographical constraints may require a resource to be instantiated in a particular country, e.g. in order to fulfill some legal requirements by the service provider.

According to some embodiments, the management rules are evaluated for computing or re-computing the selection criteria automatically upon an event being selected from a group comprising: adding of a new resource manager to the IT-service management system; instantiating an IT-service by the IT-service management system; and upon determining that the monitored load characteristics of one of the resource instances of an IT-service exceed a load threshold. Alternatively, the criteria are calculated or re-calculated upon a receipt of a manually entered or triggered command.

According to some embodiments, upon having allocated an instance of any one of the resources to the IT-service, the management engine updates the resource instance catalog by automatically adding an entry being indicative of an association of the allocated resource instance to the determined IT-service.

According to some embodiments, each of the nodes comprises at least an abstract method for creating the resource represented by said node. Instantiating the resource comprises: selecting one of the one or more resource managers in accordance with the selection criteria; sending a request to the address of the selected resource manager, the request being a request for a description of a resource-manager-specific API of said resource manager; receiving the requested description from the selected resource manager; overriding said at least one abstract method by a resource-manager specific method of the resource-manager-specific API for instantiating said resource, said resource-manager specific method being specified in the received description; and executing the overridden at least one abstract method for instantiating the resource represented by said node. Said features may allow for a highly flexible selection of resource managers for creating an additional resource instance in dependence on dynamically determined runtime parameter values of the IT-service management system.

In some embodiments, the invention relates to a computer readable storage medium comprising program instructions which, when executed by a processor, cause the processor to execute a method according to any one of the embodiments of the herein disclosed methods for allocating one or more instances of one or more resources to an IT-service. In some embodiments, the invention relates to a computer readable storage medium comprising program instructions for instantiating a resource, the program instructions when executed by a processor provide for a resource manager according to any one of the herein disclosed embodiments.

In some embodiments, the invention relates to a computer system for allocating one or more instances of one or more resources to an IT-service. Each resource is of one of one or more resource types. Each resource instance is provided by one of one or more resource managers of an IT-service management system. The computer system comprises a management engine being adapted for: analyzing a service model, the service model specifying the structure of an IT-service comprising nodes respectively representing one of the resources and respectively being indicative of a resource type of said represented resource, the service model further comprising, for each of the nodes, one or more resource management rules specifying the management of said node's resource; and for each of the nodes, executing at runtime of the IT-service management system: determining the resource type indicated by said node; determining one or more resource management rules assigned to said node; evaluating the resource management rules assigned to said node on a resource instance catalog, wherein the resource instance catalog is indicative of all currently existing instances of the one or more resources and their respective service allocation, the evaluation returning an evaluation result; computing selection criteria by taking as input the determined resource type and the evaluation result; applying the selection criteria on a service provider catalog for selecting one of the one or more resource managers, the service provider catalog being indicative of one or more of the resource managers respectively being operable to provide a resource instance of a given resource type to the IT-service; creating an instance of the resource provided by the selected resource manager; and allocating said instance to the IT-service.

According to some embodiments, the computer system further comprises the one or more resource managers, the service provider catalog, and a mechanism (e.g., a management engine) for automatically adding, upon deployment of a further resource manager to the data processing system, a further entry to the service provider catalog. The further entry is indicative of the further resource manager, of the resource type provided by said further resource manager, and of said further resource manager's provider-specific API. The further entry enables the management engine having access to the service provider catalog to determine, at runtime of the data processing system, that the further resource manager is operable to provide a resource of the one resource type and enables the management engine to interoperate with the further resource manager.

In a further aspect, the invention relates to a computer system comprising a resource manager for instantiating a resource, the resource manager being adapted for: upon deployment of the resource manager to an IT-service management system, automatically adding an entry to a service provider catalog of the IT-service management system, the further entry being indicative of the resource manager, of a resource type provided by said resource manager, and of an address of the resource manager; upon receipt of a request from a management engine of the IT-service management system, sending a description of a resource manager-specific API to the requesting management engine, the resource manager-specific API comprising at least one resource-manager specific method for instantiating said resource, wherein the entry enables the management engine having access to the service provider catalog to send, at runtime of the data processing system, the request to the address of the resource manager; and for interoperating with the management engine by means of the resource manager-specific API for instantiating the resource.

According to embodiments, the method further comprises, at runtime of the IT-service management system: adding a further resource manager to the IT-service management system, the further resource manager being adapted to provide resources of a further resource type; and as a consequence of said adding, automatically adding a further entry to the service provider catalog, the further entry being indicative of the further resource manager, the further resource type and of an address of the further resource manager.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
analyzing a service model of an IT-service, the service model including a node representing a resource for providing the IT-service;
determining a resource type of the resource being indicated by the node;
evaluating a service provider catalog to determine a resource manager being operable to instantiate the resource and an address of the resource manager;
sending a request to the address of the resource manager for a description of a resource-manager-specific API of the resource manager;
receiving the requested description from the resource manager;
overriding at least one abstract method for instantiating the resource with a resource-manager specific method of the resource-manager-specific API, the resource-manager specific method being specified in the received description; and
executing the resource-manager specific method for instantiating the resource represented by the node.

2. The method of claim 1, further comprising adding, upon deployment of a further resource manager, an entry to the service provider catalog indicative of the further resource manager.

3. The method of claim 1, further comprising, upon deployment of the resource manager, adding an entry to the service provider catalog, the entry being indicative of the resource manager, the resource type provided by the resource manager, and the address of the resource manager.

4. The method of claim 3, further comprising, upon receipt of the request, sending the description of the resource manager-specific API from the resource manager to a management engine.

5. The method of claim 1, wherein the node is a node of a graph, and wherein analyzing the service model comprises traversing the graph for instantiating the resource represented by the graph's node in accordance with a topology of the graph.

6. The method of claim 1, wherein the service model is indicative of a chronological sequence of a plurality of resources to be instantiated, the sequence being specified by a topology of a graph.

7. The method of claim 1, further comprising:
evaluating the received description for determining a data transmission protocol to be used for interoperating with the resource manager;
determining one or more API methods and API parameters to be used for interoperating with the resource manager; and
executing the interoperation by the determined transmission protocol and/or by the determined API methods and API parameters.

8. A method, comprising:
identifying a plurality of resource managers each operable to provide a resource for providing an IT-service;
analyzing a service model of the IT-service, the service model comprising nodes representing the respective resources, the nodes specifying a generic API, the generic API not being specific to any resource managers and providing at least one abstract method for instantiating the resource represented by the respective node;
selecting one of the nodes;
evaluating a service provider catalog and selecting one of the resource managers being operable to instantiate the resource as indicated by the selected node;
sending a request to the selected resource manager for a description of a resource-manager-specific API of the resource manager;
overriding the abstract method for instantiating the resource with a resource-manager specific method of the resource-manager-specific API; and
executing the resource-manager specific method for instantiating the resource represented by the node.

9. The method of claim 8, wherein the nodes are nodes of a graph, and wherein analyzing the service model comprises traversing the graph for instantiating the resource represented by the graph's node in accordance with a topology of the graph.

10. The method of claim 8, wherein the service model is indicative of a chronological sequence of a plurality of resources to be instantiated, the sequence being specified by a topology of a graph.

11. The method of claim 8, wherein the management engine is further configured for:
evaluating the description for determining a data transmission protocol to be used by the management engine for interoperating with the selected resource manager;
determining one or more API methods and API parameters to be used by the management engine for interoperating with the selected resource manager; and
wherein the interoperation is executed by the determined transmission protocol and/or by the determined API methods and API parameters.

12. The method of claim 8, wherein each resource manager includes a catalog registration unit for adding, upon deployment of the respective resource manager, an entry to the service provider catalog indicative of the respective resource manager.

13. The method of claim 12, wherein the entry is further indicative of the resource type provided by the respective resource manager and an address of the respective resource manager.

14. A method, comprising:
upon deployment of a resource manager operable to instantiate a resource of an IT-service, adding an entry to a service provider catalog of the resource manager, the entry being indicative of the resource manager, a resource type provided by the resource manager, and an address of the resource manager;
receiving a request for a description of a resource-manager-specific API of the resource manager;
sending, for the resource, the description to a management engine of an IT-service management system;
sending, to the management engine, a description of a transmission protocol for enabling the management engine to interoperate with the resource manager via the resource-manager-specific API to instantiate the resource.

15. The method of claim 14, wherein the sending of the description comprises sending at least one resource-manager specific method for instantiating the resource.

* * * * *